United States Patent [19]

Sabin

[11] Patent Number: 4,729,296

[45] Date of Patent: Mar. 8, 1988

[54] PORTABLE SELF-HEATED COOKING PRESS

[75] Inventor: Philip P. Sabin, Nashville, N.C.

[73] Assignee: Fast Food Merchandisers, Inc., Rocky Mount, N.C.

[21] Appl. No.: 867,516

[22] Filed: May 28, 1986

[51] Int. Cl.⁴ .............................................. A47J 37/06
[52] U.S. Cl. ........................................ 99/349; 99/372
[58] Field of Search ................. 99/349, 372, 377, 369, 99/442, 476, 477; 126/390

[56] References Cited

U.S. PATENT DOCUMENTS

| | | |
|---|---|---|
| 2,040,676 | 5/1936 | Stevens et al. |
| 2,161,089 | 6/1939 | Reinwald ............................. 99/349 |
| 2,559,550 | 7/1951 | Shapiro . |
| 4,165,682 | 8/1979 | Weiss . |
| 4,320,699 | 3/1982 | Binks . |
| 4,601,237 | 7/1986 | Harter .................................. 99/349 |

*Primary Examiner*—Henry S. Jaudon
*Attorney, Agent, or Firm*—Cushman, Darby & Cushman

[57] ABSTRACT

A heated platen with a downwardly-facing surface is provided with an upwardly-accessible handle, and with coordinately height-adjustable legs, the feet of which are adapted to stand on a grill as a food product such as a hamburger patty is simultaneously cooked from below by the grill and from above by the heated platen. By preference, the downwardly-facing heated surface is covered by a replaceable non-stick surface layer in the form of polytetrafluoroethylene-impregnated glass fiber cloth. The platen preferably is heated by on-board electrical resistance heating units, controlled from an off-board control panel to which it is connected by leads from an on-board temperature sensor, and an electrical power cable. Where the device is intended for use in a limited menu restaurant, an adjuster for the leg length may be calibrated by product designation, so that a user need only move the adjuster knob to a designation corresponding to the food being cooked in order to place the platen at the correct height above the grill cooking surface for contacting and lightly pressing down on the food without applying excessive compression.

14 Claims, 9 Drawing Figures

PORTABLE SELF-HEATED COOKING PRESS

BACKGROUND OF THE INVENTION

Most frequently when a flat food item is being cooked by direct contact with a hot surface, the heat is applied from underneath to the bottom surface of the food item. Then the food item is flipped over, inverted, turned, rolled or otherwise relatively moved with regard to the hot surface, in order to remove a relatively cooked portion of the item from such proximity to the heat, and simultaneously to bring a relatively uncooked portion of the item into closer proximity with the heat and so, by turns, eventually to sufficiently evenly and completely cook the food item all over. An example of this practice is the baking of a griddle cake on a hot griddle. Another example is the frying or broiling of a hamburger on a griddle.

Although not done so frequently, it is also a common practice to cook at least certain food products by applying heat simultaneously to opposite surfaces. An example of this practice is the baking of a waffle in a waffle iron.

It is known that certain food products, when being cooked by direct contact of one heated surface with one side of the product behave in a seemingly uncooperative manner, in that they warp from an originally planar shape that ca be relatively easily uniformly heated across all of its one side, into a domed or irregularly warped shape that is subject to becoming overcooked on its downwardly projecting rims, ridges and the like, while remaining undercooked on its arched surface portions. An example is the cooking of a frozen hamburger patty on a restaurant grill. Long ago some one invented a very useful instrument for use on restaurant grills. One name by which it is known is a bun press. In general, it looks like a mason's sidewalk surface finishing tool and like an old-fashioned sadiron—basically a soleplate with a handle. As a food product which would warp, or arch away from the grill, or become rippled or otherwise lose good contact of its lower side with the grill is being cooked, the grill attendant can periodically, occasionally, or even continually press down on the food product with the sole plate of the bun press, thereby to maintain good contact of the bottom side of the food product with the heated surface.

When a cook is busy at a grill and is using such a bun press more or less intermittantly, there is a tendency for him or her to 'park' the bun press beside, or even on the hot griddle surface.

At some point in the past, some enterprising individual figured out that a net benefit could be gained by 'parking' a bun press directly on the hot surface of the grill, so long as its handle was protected against getting too hot. That benefit lies in the capacity of the sole plate of the bun press not only to be useful in pushing the bottom side of the food product down into intimate contact with the hot grill surface, but also to be useful in losing some of its acquired heat to the topside of the food product, and thereby causing the food product to become sufficiently cooked in less time.

A grill is an expensive capital cost for a restaurant, and it has a significant operating cost. Any trick-of-the-trade or other modification to the state-of-the-art way of cooking a certain food on a grill that will result in the restaurant being able to cook more of that food product per unit time on the same grill surface area therefore is considered to be almost a godsend, because of its potential effect on costs.

Prior efforts have been made to combine some of the above-related concepts into topside cooker devices for assisting in the cooking of hamburgers and other products on restaurant grills. However, as for the prior efforts with which the present inventor is familiar, success remains a limited quality, in large part because the prior inventors used waffle irons and the like as too strong a role model. Accordingly, the prior art topside cookers are hinged to a grill at the rear in much the same way that an upper platen of an electric waffle baker is hinged at its rear to the waffle baker's lower platen. As a result of this constructional feature often it is difficult to get the prior art topside cooker far-enough out of the way when the grill operator is not using it, and, in any event, it is practically prohibitively costly to retrofit such a prior art topside cooker to even the brand of grill it was desrgned to go with, to say nothing of the cost of retrofitting other brands of grills, a task which can vary from the inconvenient to the impractical to the impossible.

The present invention was devised to provide an improved topside cooker which is easily provided for use on any brand of grill, which can be gotten out of the way when not in use, which is easily adjusted for topside cooking of foods of varying thickness, and which is durable and easily cleaned.

SUMMARY OF THE INVENTION

A heated platen with a downwardly-facing surface is provided with an upwardly-accessible handle, and with coordinately height-adjustable legs, the feet of which are adapted to stand on a grill as a food product such as a hamburger patty is simultaneously cooked from below by the grill and from above by the heated platen. By preference, the downwardly-facing heated surface is covered by a replaceable non-stick surface layer in the form of polytetrafluoroethylene-impregnated glass fiber cloth. The platen preferably is heated by on-board electrical resistance heating units, controlled from an off-board control panel to which it is connected by leads from an on-board temperature sensor, and an electrical power cable. Where the device is intended for use in a limited menu restaurant, an adjuster for the leg length may be calibrated by product designation, so that a user need only move the adjuster knob to a designation corresponding to the food being cooked in order to place the platen at the correct height above the grill cooking surface for contacting and lightly pressing down on the food without applying excessive compression.

An objective of the present invention is to provide a means of cooking various products from a frozen state to fully cooked in the least amount of time.

It can be used with existing cooking equipment such as flat griddles. It is economical to purchase, easy to install, useable with all types of flat griddles, has a reliable non-stick cooking surface that is quickly and easily replaceable.

In addition, it is portable, generally serviceable at the restaurant level, removable from cooking area for cleaning and has a quick height-adjusting capability for accomodating different product thickness.

This apparatus incorporates resistive heating elements into a platen type base. The base is covered by a non-stick fabric which is held tight by a spring loaded bracket. Fastened to the base plate so as to enclose the resistance heaters is a top plate which has a handle affixed to it for transporting the apparatus from a rest position to a cooking position and vice versa.

Beneath the handle on the outside of the top plate is a quick adjusting cam plate which determines leg height, or the distance in which the base platen is above the surface of the flat griddle. Leg height adjustment is determined by the product being cooked. It is desirable to apply pressure on the product being cooked for a more rapid heat transfer but not a continuing pressure which results in product being flattened to a undesirable thickness. Therefore, it is important to have a means of defining the base platen height and being quick adjusting makes it more beneficial.

At the rear of the apparatus is a connection for a power cord delivering 120 volts a.c. and thermocouple leads connecting back to a temperature controller. This temperature controller can either be mounted to a permanent fixture or stand alone, whichever suits the end use better.

The principles of the invention will be further discussed with reference to the drawings wherein a preferred embodiment is shown. The specifics illustrated in the drawings are intended to exemplify, rather than limit, aspects of the invention as defined in the claims.

DETAILED DESCRIPTION

Figure 1:
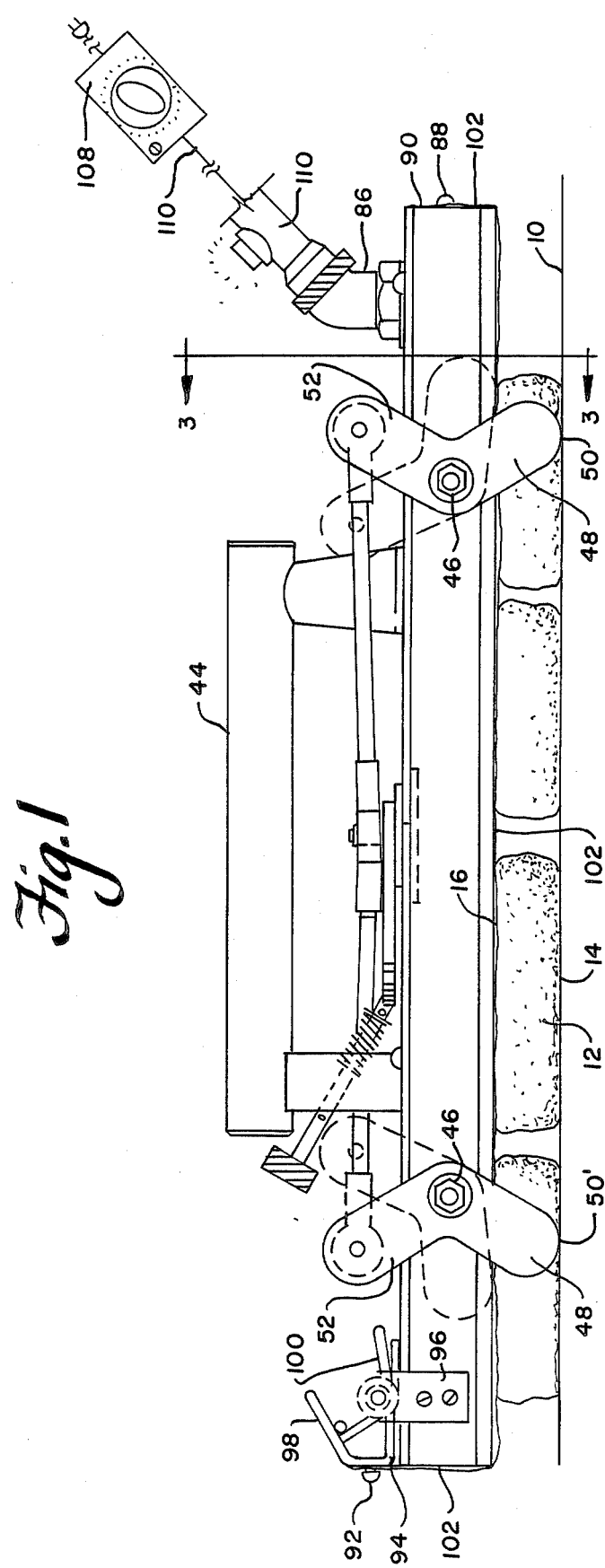
FIG. 1 is a side elevational view of a topside cooker of the present invention, shown aiding in the cooking of a food patty on a grill surface that is heated from below.

In FIG. 1, a restaurant grill upwardly-facing cooking surface, heated from below e.g. by gas burners (not shown) is indicated at 10. A food product, e.g. in the form of a quarter-pound, initially thoroughly frozen patty 12 of ground beef is shown being cooked thereon, i.e. by application of heat from the grill 10 to the bottomside 14 of the patty 12.

If one were tempted to try to cook the patty 12 as quickly as possible using only the grill 10, i.e. by turning up the heat on the grill and applying heat to the side 14, then flipping the patty 12 over and applying heat to its new bottomside (i.e. to its original topside 16), there is a strong likelihood that one would arrive at a condition in which the exterior of the patty 12 on both its sides is overly seared, crusty and tough, while its core remains certainly less cooked, probably rare and perhaps still cold. Although there is a small percentage of people who would find a product so cooked to be most delectable, the ideal for most people is a product significantly more evenly cooked, and certainly less anisotropic in its tenderness profile from surface to core.

The present invention provides a highly portable device 18 that is somewhat similar in concept to a clothes ironing iron, except that it has legs with feet to make its sole plate stand off the grill to a desired level, its control unit is located off-board, rather than on on-board, and the non-stick surface of its platen is easily replaced because it is provided as a swatch of polytetrafluoroethylene (e.g. Teflon)-impregnated heat-resistant cloth mounted on the sole plate in a way that is similar in concept to the mounting of sandpaper strips on vibratory sanders.

Figure 2:
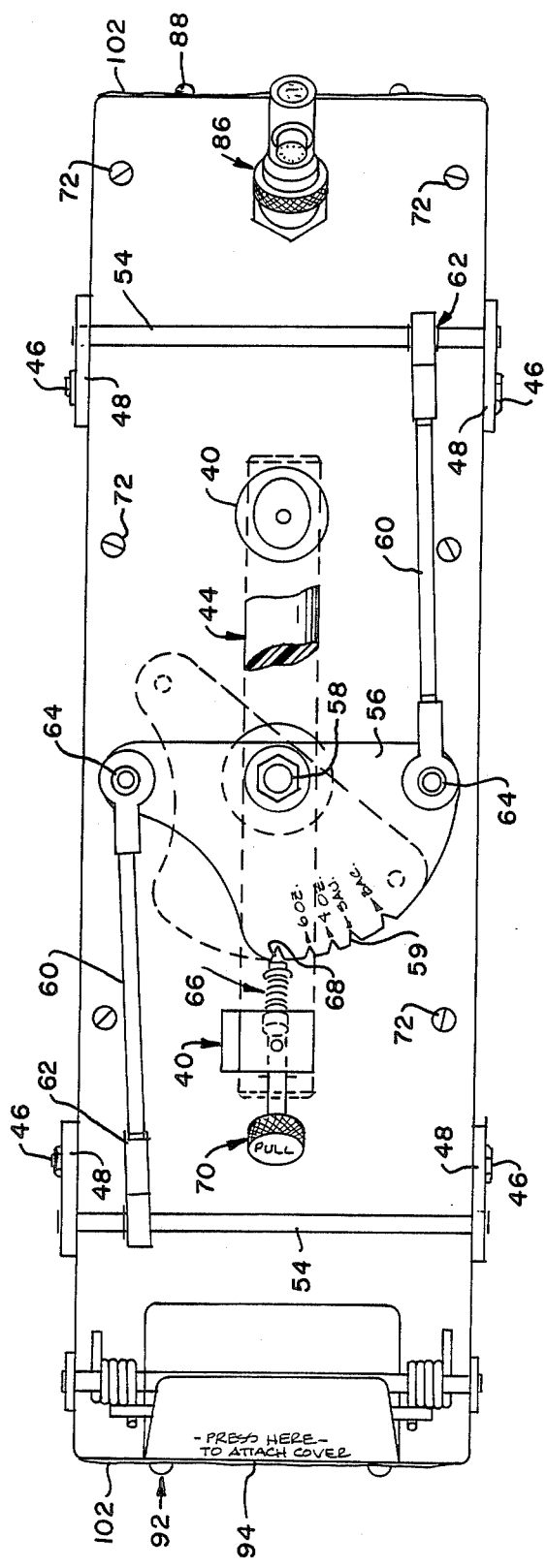
FIG. 2 is a top plan view thereof.
Figure 3:
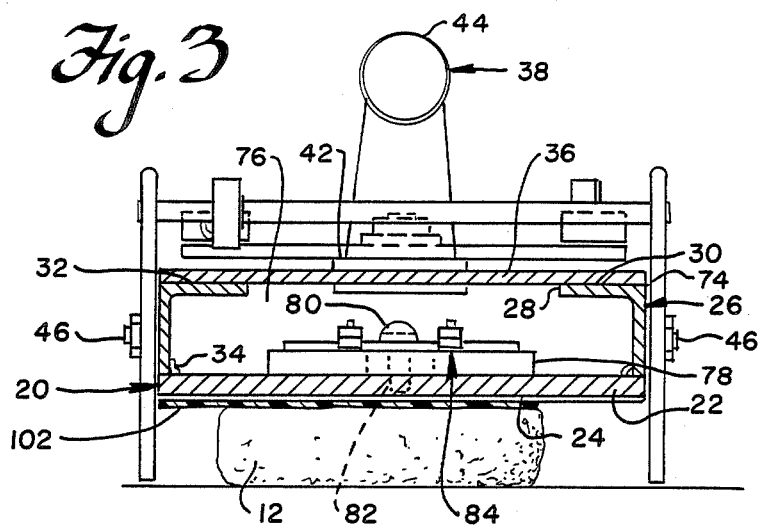
FIG. 3 is a vertical transverse cross-sectional view thereof taken on line 3—3 of FIG. 2.
Figure 5:
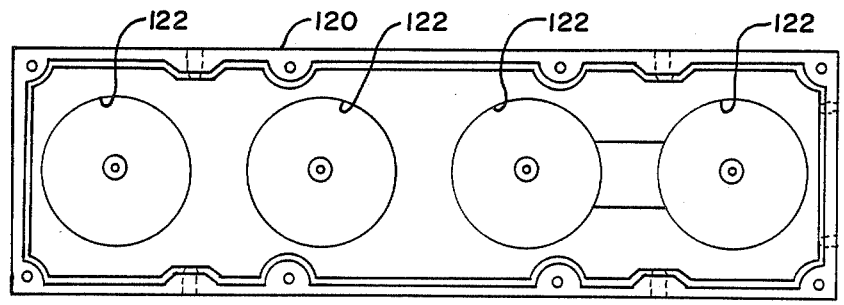
FIG. 5 is a top plan view of an alternate form for the body of the platen thereof.

In the embodiment which is shown in FIGS. 1–3, the body 20 of the device is a fabricated unit comprising a platen plate 22 having a flat, horizontal underside surface 24, and a perimetrical sidewall 26 of rectangular plan figure, providing an upwardly open mouth 28 rimmed by a medially projecting flange 30 having a flat upwardly presented outer surface 32. In this embodiment, the sidewall 26 is provided by a set of four inverted L-shaped channel members mitered and welded to one another at the corners and welded perimetircally to the plate 22, e.g. at 34. (An alternate construction for the body is shown in FIG. 5 and discussed hereinbelow.)

A top plate for the body is shown provided at 36. This plate is shown provided with a handle 38 e.g. comprising fore and aft upstanding stanchion brackets 40 secured to the plate 36 at 42 and having secured between them a handle grip 44 which extends longitudinally horizontally at a fixed elevation above the plate 36. By preference, the handle grip 44 (omitted, and suggested by dashed line in FIG. 2) is made of an engineering synthetic plastic material capable of withstanding the high temperatures to which it can be expected to be chronically exposed in use, yet not be so hot to the touch as would a metal handle. The fasteners 42 permit easy field-replacement of the handle should it become broken or degraded in use.

The body 20 near four corners of the sidewall 26 is shown provided at a common intermediate level with four transversally extending horizontal axis pivot joints 46 arranged in fore and aft pairs, with the two joints in each pair being in axial alignment transversally of the device 18.

Each pivot joint 46 mounts a respective leg 48 which is generally vertically elongated and has a foot 50 defined as its lower end. Each leg 48 is shown being symmetrical about the respective joint 46, with its upper portion, corresponding to a mirror image of its foot, providing a leg-adjustment control arm 52 which projects above the level of the top plate 36.

The control arms of the two front legs 48 are joined by a first cross-bar 54, and the control arms 52 of the two rear legs are likewise joined by a second cross-bar 54.

The top plate 36 is shown having a cam plate 56 secured thereon by a vertical axis pivot joint 58 for rotation about that axis. The peripheral edge of the cam plate 56 is shown provided with a plurality of marked notches 59, the plate beside each notch bearing a legend which could be a number, but preferably is a food product meant to be cooked using the device 18 with its cam plate 56 set to the setting which denominates that food product, e.g. "6 OZ." means six ounce frozen hamburger patty and "BAC." means bacon.

At points which are equidistant from the axis of the pivot joint 58 near opposite lateral margins of the top plate 36, the cross-bars 54 are connected to the cam plate 56 by respective, generally longitudinally extending connecting rods 60, by means of transverse horizontal axis rod-end bearings 62 and vertical axis rod-end bearings 64. Accordingly, as the cam plate 56 is rotated about the axis of the joint 58, the cross-bars 54 are coordinately pulled towards and pushed away from the joint 58 by equal amounts, thus causing the control arms 52 to rotate all four legs 48 by equal amounts, thereby selectively coordinately varying the distance D between the underside of the platen and the feet 50, i.e. the magnitude of standoff of the platen from the grill.

A spring-biased reciprocable lock pin 66 is shown mounted to the front handle stanchion bracket 40. Normally, its tip 68 is lodged in a selected notch 59 on the periphery of the cam plate 56. When the setting is to be changed, the user simply pulls on the handle 70 of the lock pin 60 so that the tip 68 is pulled out of the notch. Then after the cam plate has been manually turned to align the notch of a new setting with the tip 68, the pin handle is released so that the tip enters the newly selected notch, thus locking the legs in the corresponding more elevated or less elevated position. If needed or desired a handle (not shown) for assisting with the shifting motion could be provided on the cam plate, on the rear cross bar, or elsewhere.

By preference, and as shown, the legs 48 are angled so that in being moved between the highest and lowest settings, the pivot joints at 62 arch over the respective pivots 46 throughout a very minor part of the circumference of a circle, so that the vertical travel of the connecting rods 60 from the solid line position shown is slight.

In FIG. 1, the legs are shown in full lines providing the platen with its highest elevation; the position of the legs when the platen is lowest is suggested by dashed lines in this figure.

The top plate 36 is mounted on the flange 30 of the sidewall 26 by means of removable securement devices such as screws 72, with a flat gasket 74 e.g. of polytetrafluoroethylene sandwiched between the flange surface 32 and the top plate 36 in order to keep grease and moisture out of the internal cavity 76 of the body 20 of the device 18.

Arranged along the upper surface of the platen plate 22, within the cavity 76 are heating means, shown being provided in the form of four disk-type electrical resistance heating elements 78, each, for instance, centered over a position where a hamburger or bun may be being cooked on the grill 10 as the device 18 is being used.

Each heating element 78 is shown secured to the platen by a respective machine screw 80 removably threaded downwards into a respective upwardly opening threaded socket 82 provided in the platen 22.

Connectors for electrical power service to the individual heaters 78 are indicated by the pair shown at 84 in FIG. 3. This electrical wiring, as well as the conductors for a thermocouple (not shown in detail) socketed in a well on the plate 22 within the cavity 76 come out of the cavity through a pigtail fitting 86.

Figure 4:
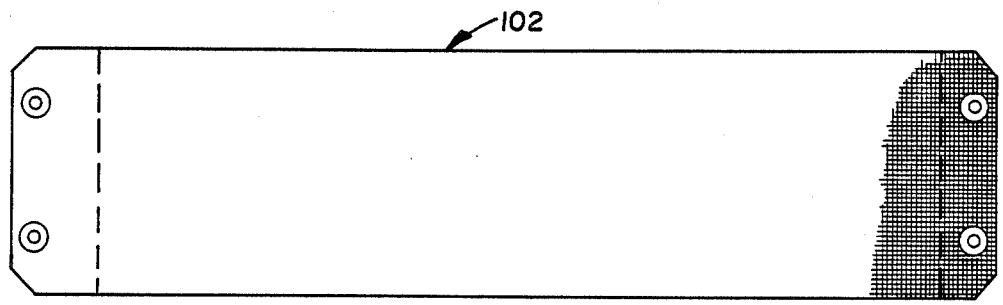
FIG. 4 is a bottom plan view of the replaceable non-stick surface cover sheet for the underside of the platen thereof.

The device 18 in its preferred embodiment is provided with an effective heated undersurface for platen 22 which undersurface is subject to being easily cleaned, e.g. by being wiped periodically with a wiping cloth and washed when necessary. By preference, the easily cleaned surface is field replaceable. This is accomplished in the illustrated embodiment, by providing a pair of transversally spaced rearwardly projecting button-headed pegs 88 on the rear end 90 of the sidewall 26, and a similar set of forwardly projecting pegs 92 on a spring clip 94 mounted by brackets 96 to the body 20, as shown. If the lever 98 on the clip 94 is raised, against the force of the spring 100, the distance longitudinally along the outside of the body from the pegs 88 to the peg 92 is temporarily shortened so that a platen base cover 102 can be wrapped under the platen and fastened on the pegs e.g. by inserting the pegs through respective holes 104 (FIG. 4). The holes 104 can be reinforced by annular grommets 106, or simply punched through the material of the sheet 102, as appropriate. Upon releasing the lever 98, the spring 100 recovers, tautening the base cover 102.

In a typical device 18, the area of the underside of the platen is approximately 5×20 inches. Larger and smaller devices are possible.

By preference, the base cover 102 is made of polyfluorinated olefin resin-impregnated woven glass fiber cloth, e.g. a material that is presently commercially available under the tradename Chemfab as an FDA-approved fabric suitable for use in contact with food in or on cooking utensils or equipment. The grill surface 10 could be similarly replaceably covered with a non-stick surface.

In use, a restaurant in the neighborhood of a grill 10 is provided with a temperature-settable heating control unit 108 which can be plugged into a standard eletrical outlet (e.g. 115 volts, 10 amps). By preference, this control unit has a temperature setting dial and an on-off switch. It may also have a light for indicating when the on-off switch is on and/or a light for indicating when the control unit is furnishing electrical power to the device 18. A coaxial cable 110 for electrical power and thermocouple leads is provided from the control unit 108. This cable 110 terminates in a connector which can be disconnectably connected with the pigtail fitting 86 of the unit 18.

Because the controls are in a box located off-board the device 18, there is less weight and complexity on the unit 18, it can more easily be field serviced and there is less of a chance that condensation or hot grease will damage the controls or shorten the life of any control equipment. Further, ruggedization is enhanced and cleaning is facilitated.

In practice, the bottom of the platen typically would be maintained at about 300° F., depending on the dial setting made on the control box, which is at or somewhat below the usual 325° F.-350° F. running temperature for a fast food store hamburger cooking grill which is grilling ground beef patties from the frozen state.

A four ounce hamburger patty 0.6 inch thick takes about 4 minutes and 20 seconds to cook on a conventional grill from a frozen state using a conventional hand press which has no on-board heater. The same hamburger patty can be cooked to the same profile of doneness using the apparatus of the present invention in 3 minutes and 15 seconds.

Although the first reaction of the inventor was to provide the platen with a depending skirt about the legs in order to confine the heat, his present preference has come to be for an open periphery so as to permit the escape of steam, partly in order to retard the build-up of a sticky condensate on the grill. Any condensate build-up on the platen cover of the device 18 can, of course, simply be wiped-off, due to the non-stick nature of the cover.

In FIG. 5, there is depicted at 120 an alternate form for the body 20, which for convenience in higher volume production is a cast unit, rather than one welded of plate, wells 122 being provided for convenient reception of the electrical resistance heating units.

Figure 6:
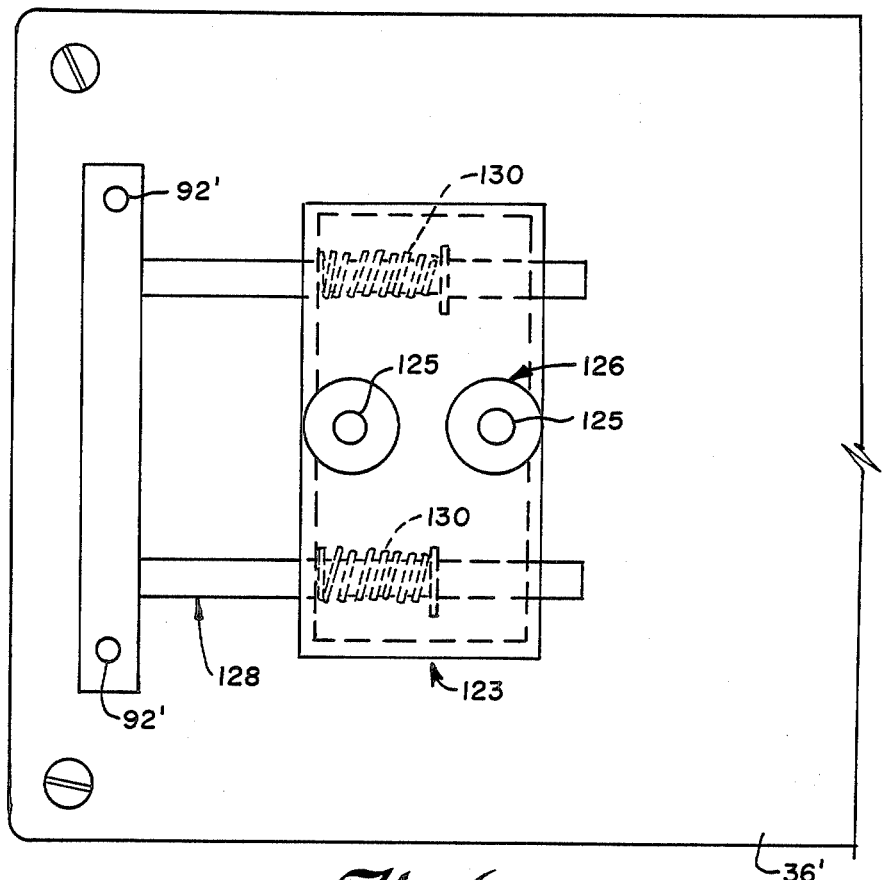
FIGS. 6 and 7 show in fragmentary top plan and side elevation views, respectively, an alternate way of removably securing the replaceable non-stick surface cover sheet in place.
Figure 7:
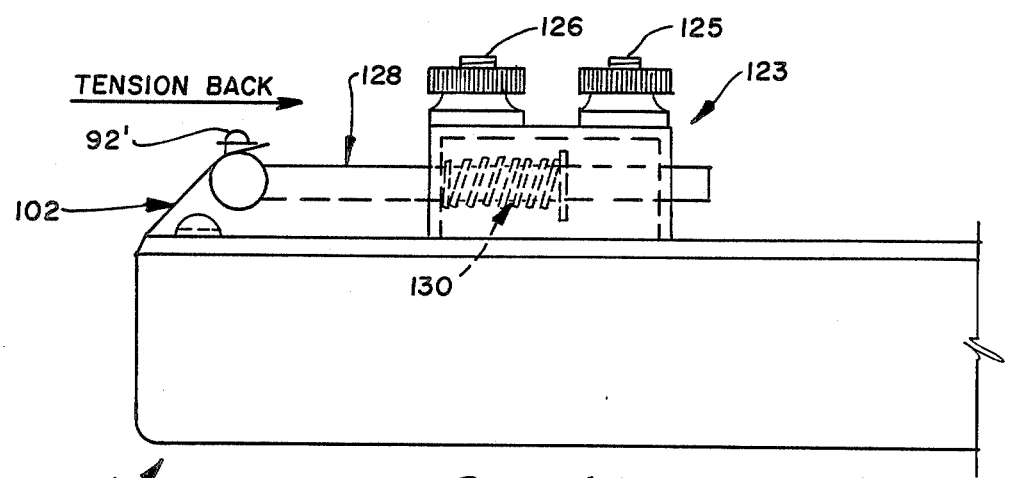

An alternate constructional feature for any embodiment of the invention is shown in FIGS. 6 and 7.

In FIGS. 6 and 7, the replaceable non-stick surface cover sheet 102 is removably held in place on the press 18' by a modified retainer/tensioner 123 the body 124 of which is mounted on the top plate 36' by studs 125 provided with fasteners 126 such as thumb screws. The slidable yoke 128 on which the mushroom-headed pegs 92' are provided is spring-biased into tensioning the cover sheet 102, by springs 130 which act between the slideable yoke 128 and body 124 of the retainer/tensioner 123. The yoke can be manually slid against spring tension in order to permit a worn cover sheet 102 to be replaced, or a used one removed for facilitating cleaning of the cover sheet and/or other parts of the device. The retainer/tensioner 123 can be removed for facilitating cleaning of the retainer/tensioner 123 and/or other parts of the device 18', by unscrewing the thumb screws 126.

Figure 8:
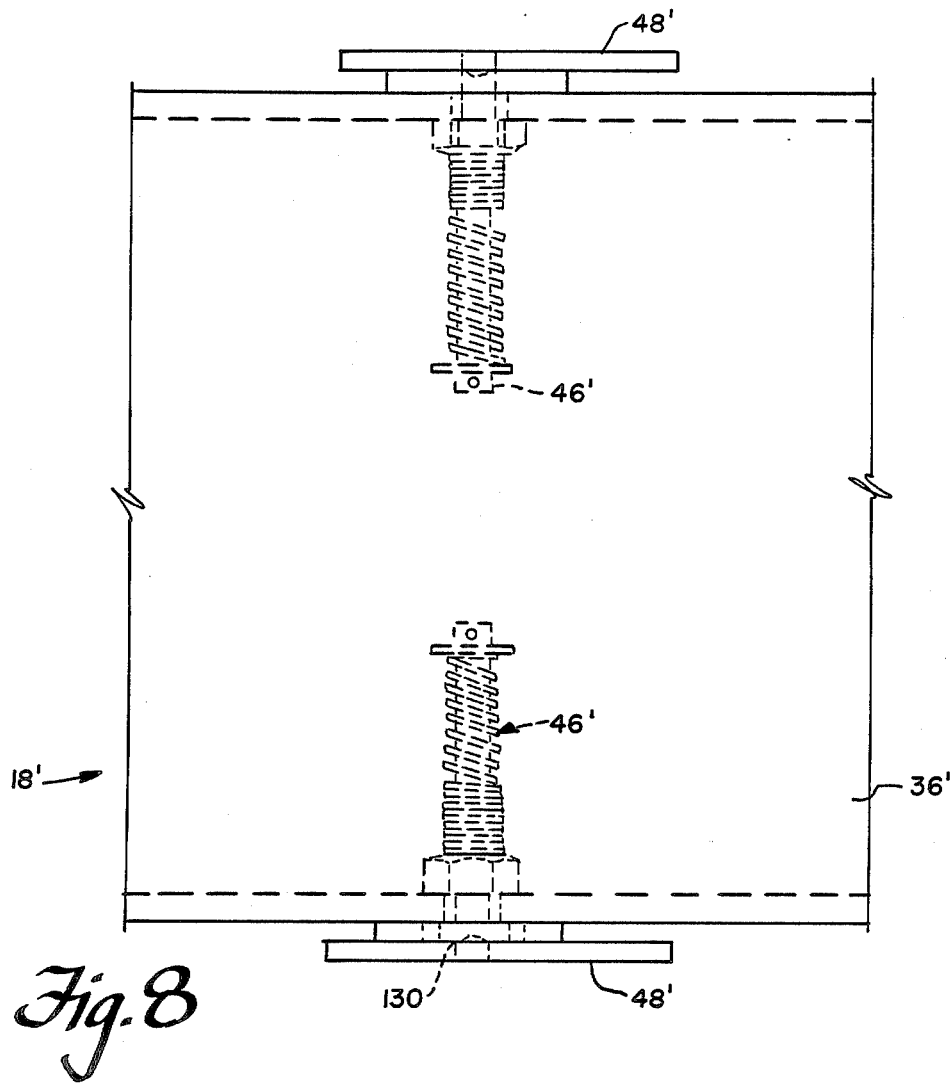
FIGS. 8 and 9 show in fragmentary top plan and side elevation views, respectively, an alternate way of providing coordinate adjustments for the effective lengths of the height-adjusting legs.
Figure 9:
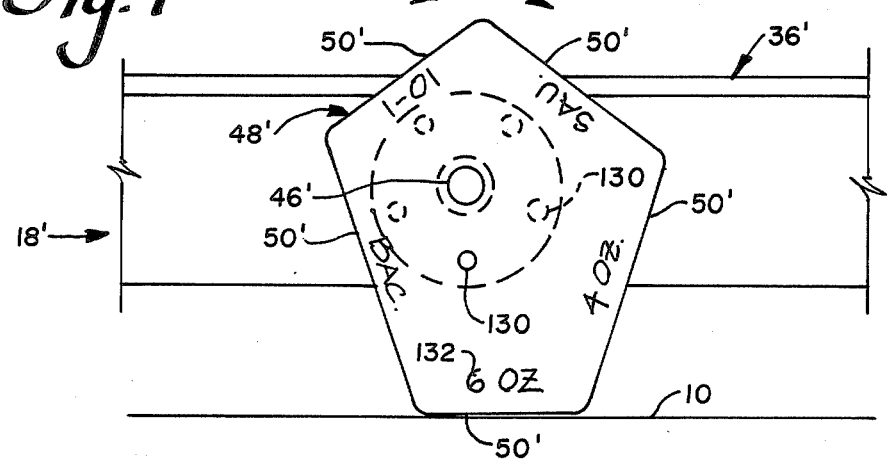

Another alternate constructional feature for any embodiment of the invention is shown in FIGS. 8 and 9.

In FIGS. 8 and 9, the previously described feet and means for coordinately adjusting the height that the heated platen is supported above the grill surface by adjustment of the effective length of the legs, is replaced by a somewhat simpler structure: each leg 48' is provided separately from the others, as a like irregular polygon such as a pentagon having two sides of equal length or at least no two sides are equally distant from a point. Each leg is provided at the corresponding site with a medially projecting axle 46' by which the leg is secured to the device. A spring-urged catch/detent structure 130 is provided for maintaining each leg 48' at an orientation such that a selected one of its sides 50' is presented horizontally downwards as a support foot. Each foot 50', on its laterally presented face preferably is provided adjacent each alternately useable foot thereof with a legend 132 e.g. corresponding to a height, or to a particular product to be cooked using the device with its correspondingly marked feet all presented downwards. Although the plate-like legs 48' must be individually adjusted, correspondance in adjustment is facilitated by the spring-urged catch/detent structure 130, and the legends 132 marked beside the respective feet.

A device having the structures shown in FIGS. 6-9 is cheaper to make and easier to clean than the device having the structures shown in FIGS. 1-4 or 5.

Although electrical heating of the platen is preferred, a hot fluid such as hot oil, hot air or the like could be circulated through the body by means of a connector to a pump in a manner physically similar to the electrical cable and control box which is shown.

It should now be apparent that the portable self-heated cooking press as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A portable self-heated cooking press, comprising:
    a body including a generally horizontal bottom plate having an underside;
    leg means mounted to said body and projecting below said underside of said bottom plate to engage an upwardly-facing generally horizontal surface for supporting said bottom plate at at least one selected height above said upwardly-facing surface;
    a handle, and means securing said handle on said body for manual access from above said body so that said body is free to be moved laterally and lifted away from said upwardly-facing surface so that said legs are no longer supported on said upwardly-facing surface;
    means for applying heat to said bottom plate from above said underside both while said body is supported on said upwardly-facing surface by said leg means and while said body is lifted away therefrom by use of said handle;
    said body being provided as a hollow structure having a cavity of which said bottom plate provides a defining portion;
    said means for applying heat to said bottom plate comprising means for adding heat to said bottom plate from within said cavity;
    said means for applying heat to said bottom plate comprising at least one electrical resistance-type heating unit disposed in said cavity in a heat exchange relationship with said bottom plate;
    a temperature sensor on-board said body and adapted for sensing temperature in the vicinity of said bottom plate;
    an off-board electrical control unit adapted for furnishing electrical power to said at least one electrical resistance heating unit when the temperature as sensed by said temperature sensor is below a selected value;
    electrical and temperature sensor signal reporting conductor means penetrating said body and operatively connecting said at least one electrical resistance-type heating unit and said temperature sensor with said off-board electrical control unit;
    means for coordinately lengthening and shortening said leg means for selecting how far said underside of said bottom plate will be spaced above said upwardly-facing surface when said leg means are supported on said upwardly-facing surface;
    said leg means comprising four legs pivotally secured to said body for pivotal movement about respective horizontal axes; and
    said means for coordinately lengthening and shortening said leg means comprising a rotatable cam plate means; connecting rod means connecting said cam plate means with said legs for coordinated rotation of said legs upon rotation of said cam plate means; and latch means for selectively locking said cam plate means relative to said body in each of a plurality of rotational positions.

2. The portable self-heated cooking press of claim 1, wherein:
    said at least one electrical resistance-type heating unit is constituted by a plurality of disk-shaped heating units physically arranged in a linear series.

3. The portable self-heated cooking press of claim 1, wherein:
said latch means includes detent means provided on said cam plate and a withdrawable/engageable pin mean for selective engagement with said detent means; and
a respective indicator legend provided on said cam plate beside each of a plurality of said detent means.

4. The portable self-heated cooking press of claim 3, wherein:
at least one of said indicator legends denominates a product to be topside cooked by said topside cooker.

5. The portable self-heated cooking press of claim 1, further comprising:
a non-stick surface means provided on said underside of said bottom plate.

6. The portable self-heated cooking press of claim 5, wherein:
said non-stick surface means is removably mounted to said body for ease of replacement.

7. The portable self-heated cooking press of claim 6, wherein:
said non-stick surface means is constituted by a sheet of polyfluorinated olefin-containing high temperature-resistant cloth; and
said portable self-heated cooking press further includes means for removably fastening said cloth to said body.

8. The portable self-heated cooking press of claim 7, wherein:
said cloth is made of polytetrafluroethylene-impregnated woven glass fiber.

9. The portable self-heated cooking press of claim 1, wherein:
said body, perimetrically of said bottomplate is substatially skirtless in order to facilitate escape of steam from food being topside cooked by said portable self-heated cooking press.

10. Apparatus for cooking a food patty which has a topside and a bottomside by simultaneously applying heat to both said topside and said bottomside,
said apparatus comprising:
a grill means having an upwardly-facing generally horizontal food patty bottomside supporting surface heated from below; and
a portable self-heated cooking press comprising:
a body including a generally horizontal bottom plate having an underside;
leg means mounted to said body and projecting below said underside of said bottom plate to engage said upwardly-facing generally horizontal surface for supporting said bottom plate at at least one selected height above said upwardly-facing surface;
a handle, and means securing said handle on said body for manual access from above said body so that said body is free to be moved laterally and lifted away from said upwardly-facing surface so that said legs are no longer supported on said upwardly-facing surface;
means for applying heat to said bottom plate from above said underside both while said body is supported on said upwardly-facing surface by said leg means and while said body is lifted away therefrom by use of said handle;
said body being provided as a hollow structure having a cavity of which said bottom plate provides a defining portion;
said means for applying heat to said bottom plate comprising means for adding heat to said bottom plate from within said cavity;
said means for applying heat to said bottom plate comprising at least one electrical resistance-type heating unit disposed in said cavity in a heat exchange relationship with said bottom plate;
a temperature sensor on-board said body and adapted for sensing temperatrue in the vicinity of said bottom plate;
an off-board electrical control unit adapted for furnishing electrical power to said at least one electrical resistance heating unit when the temperature as sensed by said temperature sensor is below a selected value;
electrical and temperature sensor signal reporting conductor means penetrating said body and operatively connecting said at least one electrical resistance-type heating unit and said temperature sensor with said off-board electrical control unit;
a non-stick surface means provided on said underside of said bottom plate;
said non-stick surface means being constituted by a sheet of polyfluorinated olefin-containing high temperature-resistant cloth;
said portable self-heated cooking press further including means for removably fastening said cloth to said body;
means for coordinately lengthening and shortening said leg means for selecting how far said underside of said bottom plate will be spaced above said upwardly-facing surface when said leg means are supported on said upwardly-facing surface;
said leg means comprising four legs pivotally secured to said body for pivotal movement about respective horizontal axes; and
said means for coordinately lengthening and shortening said leg means comprising a rotatable cam plate means; connecting rod means connecting said cam plate means with said legs for coordinated rotation of said legs upon rotation of said cam plate means; and latch means for selectively locking said cam plate means relative to said body in each of a plurality of rotational positions.

11. The apparatus of claim 10, wherein:
said latch means includes detent means provided on said cam plate and a withdrawable/engageable pin means for selective engagement with said detent means; and
a respective indicator legend provided on said cam plate beside each of a plurality of said detent means.

12. The apparatus of claim 11, wherein:
at least one of said indicator legends denominates a product to be topside cooked by said topside cooker.

13. The apparatus of claim 10, wherein:
said cloth is made of polytetrafluroethylene-impregnated woven glass fiber.

14. The apparatus of claim 10, wherein:
said body, perimetrically of said bottomplate is substantially skirtless in order to facilitate escape of steam from food being topside cooked by said portable self-heated cooking press.

* * * * *